(12) United States Patent
Konuma

(10) Patent No.: US 9,344,591 B2
(45) Date of Patent: May 17, 2016

(54) DISPLAY METHOD, DISPLAY METHOD OF IMAGE FORMING APPARATUS, DISPLAY DEVICE AND IMAGE FORMING APPARATUS

(75) Inventor: Shigeo Konuma, Hachioji (JP)

(73) Assignee: KONICA MINOLTA BUSINESS TECHNOLOGIES, INC., Tokyo (JP)

( * ) Notice: Subject to any disclaimer, the term of this patent is extended or adjusted under 35 U.S.C. 154(b) by 361 days.

(21) Appl. No.: 12/895,989

(22) Filed: Oct. 1, 2010

(65) Prior Publication Data

US 2011/0083095 A1 Apr. 7, 2011

(30) Foreign Application Priority Data

Oct. 6, 2009 (JP) .................................. 2009-232644

(51) Int. Cl.
*G06F 15/00* (2006.01)
*G06F 3/048* (2013.01)
*H04N 1/00* (2006.01)

(52) U.S. Cl.
CPC ....... *H04N 1/00408* (2013.01); *H04N 1/00477* (2013.01); *H04N 1/00482* (2013.01); *H04N 1/00954* (2013.01)

(58) Field of Classification Search
CPC . G06F 3/0481; G06F 3/04817; G06F 9/4443; G06F 3/04847; G06F 11/3664; H04N 1/00408; H04N 1/00477; H04N 1/00482; H04N 1/00954
USPC ................................. 715/772; 358/1.14–1.18
See application file for complete search history.

(56) References Cited

U.S. PATENT DOCUMENTS

| | | | | |
|---|---|---|---|---|
| 5,260,805 | A  * | 11/1993 | Barrett ........................ | 358/449 |
| 6,380,953 | B1 * | 4/2002 | Mizuno ........................ | 715/764 |
| 7,191,028 | B2 * | 3/2007 | Nomura et al. ............... | 700/100 |
| 7,249,356 | B1 * | 7/2007 | Wilson et al. ................ | 718/101 |
| 7,458,033 | B2 * | 11/2008 | Bacigalupi et al. ........... | 715/772 |
| 8,023,133 | B2 * | 9/2011 | Kaneko ........................ | 358/1.15 |
| 8,233,815 | B2 * | 7/2012 | Inenaga et al. ................ | 399/81 |

(Continued)

FOREIGN PATENT DOCUMENTS

| | | |
|---|---|---|
| EP | 1 473 661 A1 | 11/2004 |
| JP | 6-242916 A | 9/1994 |

(Continued)

OTHER PUBLICATIONS

Extended European Search Report (EESR) dated Jul. 23, 2012 (in English) issued in counterpart European Application No. 10181860.7.

(Continued)

*Primary Examiner* — Jennifer To
*Assistant Examiner* — John Repsher, III
(74) *Attorney, Agent, or Firm* — Holtz, Holtz & Volek PC

(57) ABSTRACT

A display method for displaying a schedule screen which indicates an execution reservation state of JOBS on a display section, the method including the step of displaying a part or the whole of information concerning two or more of the JOBs, by superimposing on the schedule screen, according to a display condition; and displaying, in cases where information which is required to be recognized by a user exists in the information displayed by superimposing, the information required to be recognized by the user on an uppermost layer to be visible.

28 Claims, 10 Drawing Sheets

(56) References Cited

U.S. PATENT DOCUMENTS

| | | | |
|---|---|---|---|
| 8,270,865 B2* | 9/2012 | Arai et al. | 399/81 |
| 2002/0057455 A1 | 5/2002 | Gotoh et al. | |
| 2002/0135792 A1* | 9/2002 | Sommer et al. | 358/1.13 |
| 2004/0218197 A1* | 11/2004 | Vliembergen et al. | 358/1.6 |
| 2005/0198209 A1* | 9/2005 | Barrett | 709/219 |
| 2005/0243365 A1* | 11/2005 | Noda | 358/1.15 |
| 2005/0270566 A1 | 12/2005 | Tanaka | |
| 2006/0044594 A1 | 3/2006 | Shirai | |
| 2006/0197977 A1 | 9/2006 | Miyata | |
| 2007/0136296 A1* | 6/2007 | Molesky | 707/10 |
| 2007/0201079 A1 | 8/2007 | Caine | |
| 2008/0154688 A1* | 6/2008 | Toumanova et al. | 705/9 |
| 2009/0161132 A1* | 6/2009 | Sato | 358/1.9 |
| 2010/0017740 A1* | 1/2010 | Gonzalez Veron et al. | 715/777 |
| 2010/0083111 A1* | 4/2010 | de los Reyes | 715/702 |
| 2011/0051187 A1* | 3/2011 | Konuma | 358/1.15 |
| 2011/0052242 A1* | 3/2011 | Kamata | 399/82 |

FOREIGN PATENT DOCUMENTS

| | | |
|---|---|---|
| JP | 2002-063004 A | 2/2002 |
| JP | 2004348713 A | 12/2004 |
| JP | 2006-202183 A | 8/2006 |

OTHER PUBLICATIONS

Japanese Office Action dated Jun. 21, 2013 (and English translation thereof) in counterpart Japanese Application No. 2009-232644.
Japanese Office Action dated Mar. 28, 2014 in counterpart Japanese Application No. 2009-232644.

* cited by examiner

| | | 301 | 302 | 303 | 304 | 305 | | |
|---|---|---|---|---|---|---|---|---|
| | | MACHINE STATUS | JOB LIST | READ-OUT | COPY | SCAN | 2008/11/29 13:53 | |

DISPLAY SCALE CAN BE CHANGED BY ZOOM BUTTON
JOB INFORMATION CAN BE DISPLAYED BY TOUCHING A BAR
SET NUMBER 0000

| TEMPORARY STORAGE JOB | OUTPUT RESERVE JOB | SCHEDULING | OUTPUT HISTORY | TRANSMISSION HISTORY | UN-OUTPUT HISTORY | EXPANSION STATUS |

REQUIRED TIME (MIN.)  0   0.5   1.0   1.5   2.0   2.5   3.0   3.5   4.0

1  INFINITE FORM 64-74g/m²  123
2  B4  64-74g/m²  PLAIN PAPER  — JB3, JB8
3  A4  64-74g/m²  12345
4  8.5x11  64-74g/m²  TEST 4
5  8.5x11  64-74g/m²  PLAIN PAPER  — JB9, JB10
6  12x18  64-74g/m²  PLAIN PAPER  — JB11
7
8
9
PI1  A4  106-135g/m²  COATED PAPER GL
PI2  A4  106-135g/m²  COATED PAPER GL
PIB  INFINITE FORM  106-135g/m²  COATED PAPER GL
* RELEVANT PAPER UNAVAILABLE 320  322

UNIT CHANGE                                    IMAGE ROTATION

| | | | | | | | | |
|---|---|---|---|---|---|---|---|---|
| MACHINE STATUS | JOB LIST | READ-OUT | COPY | SCAN | | 2008/11/29 13:53 | | |

DISPLAY SCALE CAN BE CHANGED BY ZOOM BUTTON
JOB INFORMATION CAN BE DISPLAYED BY TOUCHING A BAR

SET NUMBER 0000

| TEMPORARY STORAGE JOB | OUTPUT RESERVE JOB | SCHEDULING | OUTPUT HISTORY | TRANSMISSION HISTORY | UN-OUTPUT HISTORY | EXPANSION STATUS |

| # | REQUIRED TIME (MIN.) | 0 | | JB2 | | 10 | | | 20 | | 30 |
|---|---|---|---|---|---|---|---|---|---|---|---|
| 1 | INFINITE FORM 64-74g/m² 123 | | | | JB3 | | | | | | |
| 2 | B4 PLAIN PAPER 64-74g/m² | | | ■ | | | | | | | |
| 3 | A4 64-74g/m² 12345 | | | | | JB5 | | | | | |
| 4 | 8.5x11 64-74g/m² TEST 4 | | | | | JB4 | | | | | |
| 5 | 8.5x11 PLAIN PAPER 64-74g/m² | | JB1 | | | | | | | | |
| 6 | 12x18 PLAIN PAPER 64-74g/m² | | | | | | JB6 | | | JB7 | |
| 7 | | | | | | | | | | | |
| 8 | | | | | | | | | | | |
| 9 | | | | | | | | | | | |
| Pl1 | A4 106-135g/m² COATED PAPER GL | | | | | | | | | | |
| Pl2 | A4 106-135g/m² COATED PAPER GL | | | | | | | | | | |
| PlB | INFINITE FORM 106-135g/m² COATED PAPER GL | | | | | | | | | | |

* RELEVANT PAPER UNAVAILABLE 320 322

UNIT CHANGE    IMAGE ROTATION

| | | | | | | | | | |
|---|---|---|---|---|---|---|---|---|---|
| 301 | 302 | 303 | 304 | 305 | | | | | |

☐ MACHINE STATUS  ☰ JOB LIST  ✎ READ-OUT  🖨 COPY  🖨 SCAN  2008/11/29 13:53  ⌛ ○

ⓘ DISPLAY SCALE CAN BE CHANGED BY ZOOM BUTTON
   JOB INFORMATION CAN BE DISPLAYED BY TOUCHING A BAR

SET NUMBER 0000

| TEMPORARY STORAGE JOB | OUTPUT RESERVE JOB | SCHEDULING | OUTPUT HISTORY | TRANSMISSION HISTORY | UN-OUTPUT HISTORY | EXPANSION STATUS |
|---|---|---|---|---|---|---|

| | REQUIRED TIME (MIN.) | 0 | 0.5 | 1.0 | 1.5 | 2.0 | 2.5 | 3.0 | 3.5 | 4.0 |
|---|---|---|---|---|---|---|---|---|---|---|
| 1 | INFINITE FORM 64-74g/m² 123 | | JB2,3,5 | | | | | | | |
| 2 | B4 PLAIN PAPER 64-74g/m² | | | | | | | | | |
| 3 | A4 64-74g/m² 12345 | | JB1 | | | | | | | |
| 4 | 8.5x11 64-74g/m² TEST 4 | | JB4 | | | | | | | |
| 5 | 8.5x11 PLAIN PAPER 64-74g/m² | | JB6 | JB7 | | | | | | |
| 6 | 12x18 PLAIN PAPER 64-74g/m² | | | JB8 | | | | | | |
| 7 | | | | | | | | | | |
| 8 | | | | | | | | | | |
| 9 | | | | | | | | | | |
| PI1 | A4 COATED PAPER GL 106-135g/m² | | | | | | | | | |
| PI2 | A4 COATED PAPER GL 106-135g/m² | | | | | | | | | |
| PIB | INFINITE FORM 106-135g/m² COATED PAPER GL | | | | | | | | | |

* RELEVANT PAPER UNAVAILABLE

[UNIT CHANGE]   ⊖ 320   ⊕ 322     ✦ IMAGE ROTATION

| | MACHINE STATUS | JOB LIST | READ-OUT | COPY | SCAN | 2008/11/29 13:53 |

DISPLAY SCALE CAN BE CHANGED BY ZOOM BUTTON
JOB INFORMATION CAN BE DISPLAYED BY TOUCHING A BAR

SET NUMBER 0000

| TEMPORARY STORAGE JOB | OUTPUT RESERVE JOB | SCHEDULING | OUTPUT HISTORY | TRANSMISSION HISTORY | UN-OUTPUT HISTORY | EXPANSION STATUS |

| | REQUIRED TIME (MIN.) | 0 | 0,5 | 1,0 | 1,5 | 2,0 | 2,5 | 3,0 | 3,5 | 4,0 |
|---|---|---|---|---|---|---|---|---|---|---|
| 1 | INFINITE FORM 64-74g/m² 123 | | JB2 | | | | | | | |
| 2 | B4 PLAIN PAPER 64-74g/m² | | JB3,5 | | | | | | | |
| 3 | A4 12345 64-74g/m² | | JB1 | | | | | | | |
| 4 | 8.5x11 TEST 4 64-74g/m² | | JB4 | | | | | | | |
| 5 | 8.5x11 PLAIN PAPER 64-74g/m² | | | JB7 | | | | | | |
| 6 | 12x18 PLAIN PAPER 64-74g/m² | | JB6 | JB8 | | | | | | |
| 7 | | | | | | | | | | |
| 8 | | | | | | | | | | |
| 9 | | | | | | | | | | |
| PI1 | A4 106-135g/m² COATED PAPER GL | | | | | | | | | |
| PI2 | A4 106-135g/m² COATED PAPER GL | | | | | | | | | |
| PIB | INFINITE FORM 106-135g/m² COATED PAPER GL | | | | | | | | | |

* RELEVANT PAPER UNAVAILABLE

| UNIT CHANGE | | 320 322 | | IMAGE ROTATION |

301 302 303 304 305 300f

US 9,344,591 B2

DISPLAY METHOD, DISPLAY METHOD OF IMAGE FORMING APPARATUS, DISPLAY DEVICE AND IMAGE FORMING APPARATUS

CROSS REFERENCE TO RELATED APPLICATION

The present application is based on Japanese Patent Application No. 2009-232644 filed with Japanese Patent Office on Oct. 06, 2009, the entire content of which is hereby incorporated by reference.

BACKGROUND OF THE INVENTION

1. Technical Field

The present invention relates to a display method that displays a schedule screen showing an execution reservation state of JOB on a display section of an image forming apparatus, a display device and an image forming apparatus.

2. Background

With respect to sizes of various buttons which are displayed on a display section that is provided on an image forming apparatus and represent an object of operation by a user, they are usually determined by taking operations on a touch panel and operations on a mouse into account. On the display screen that displays an execution reservation state for plural JOBs, for example, on the JOB list screen, information concerning plural JOBs, is displayed on the screen in accordance of the aforesaid schedule.

However, for the object whose size and position cannot be determined only one-sidedly, it is impossible to take the configuration mentioned above. For example, in the case of the screen structure showing reserved JOB at a size corresponding to its time scale, JOB itself sometimes disappears from the screen if the scale on the horizontal axis is switched to a larger unit.

Therefore, when plural screens need to be displayed on a display section, there has been suggested a mode wherein plural screens are drawn to be superimposed, and an operation system to turn over a window for displaying contents existing on the lower layer of the displayed contents which have been drawn to be superimposed, is provided, so that information may be displayed through user operations (see Unexamined Japanese Patent Application Publication No. 6-242916).

However, when JOBs each requiring writing to be superimposed are in existence continuously, there occurs unfortunately a state wherein plural JOBs exist in a size shown by one dot representing a minimum unit on a screen, and in particular, JOB that is different from ordinary state exists to obstruct a user to know the existence of the information on its screen, even when information to be recognized by the user such as warning exists. Therefore, even in the case where information for warning exists in a lower layer, it is difficult to arrive at a moment to display the aforesaid information by the aforesaid operation of turning over the window. In this case, a user can view each JOB, and it is necessary for the user to switch the scale to the selectable size.

The present invention has been achieved in view of the aforesaid problems, and in the invention, when a unit of the display scale is not appropriate as stated above, and when plural pieces of JOB information exist on the same position, those pieces of information are displayed to be superimposed, and when JOB whose state is different from ordinary state is in existence, a user can recognize existence of the JOB without requiring operations such as scale changes, by displaying the JOB on the uppermost layer, and an improvement of operability can be aimed, by making selection operations concerning the aforesaid JOB to be possible by request.

SUMMARY

In order to achieve the above-mentioned objective, a display method reflecting one aspect of the present invention is the method for displaying a schedule screen which indicates an execution reservation state of JOBs on a display section, including the steps of: displaying a part or the whole of information concerning two or more of the JOBs, by superimposing on the schedule screen, according to a display condition; and displaying, in cases where information which is required to be recognized by a user exists in the information displayed by superimposing, the information required to be recognized by the user on an uppermost layer to be visible.

The display method of the image forming apparatus reflecting another aspect of the present invention is a method for displaying a schedule screen which displays the execution reservation state of JOBs to execute printing through image formation, on the display section of an image formation apparatus, the method including the steps of displaying a part or the whole of information concerning two or more of the JOBs, by superimposing on the schedule screen, according to a display condition; and displaying, in cases where information which is required to be recognized by a user exists in the information displayed by superimposing, the information required to be recognized by the user on an uppermost layer to be visible.

The display device of the invention reflecting another aspect of the present invention includes: a display section which displays information; and a control section which controls the display section, the control section being configured to control to display a schedule screen indicating an execution reservation state of JOB on the display section, to display a part or the whole of information concerning two or more of the JOBs, by superimposing on the schedule screen, according to a display condition, and to display, in cases where information which is required to be recognized by a user exists in the information displayed by superimposing, the information required to be recognized by the user on an uppermost layer to be visible.

The image forming apparatus reflecting another aspect of the present invention includes: an image forming section which executes an image formation based on image data; a display section which displays information; and a control section which controls the image forming section and the display section, the control section being configured to control to display a schedule screen indicating an execution reservation state of JOB on the display section, to display a part or the whole of information concerning two or more of the JOBs, by superimposing on the schedule screen, according to a display condition, and to display, in cases where information which is required to be recognized by a user exists in the information displayed by superimposing, the information required to be recognized by the user on an uppermost layer to be visible.

BRIEF DESCRIPTION OF THE DRAWINGS

These and other objects, advantages and features of the invention will become apparent from the following description thereof taken in conjunction with the accompanying drawings in which:

FIG. 4 is a diagram showing an example of the schedule screen displayed by the conventional display method when the display scale is changed, relating to an embodiment of the invention;

FIG. 5 is a diagram showing an example of the schedule screen displayed by the display method of the invention when the display scale is changed, relating to an embodiment of the invention;

FIG. 8 is a diagram showing another example of a structure of the schedule screen, relating to an embodiment of the invention;

FIG. 9 is a diagram showing an example of a structure of the schedule screen displayed by the conventional display method when the display scale is changed, relating to an embodiment of the invention; and FIG. 10 is a diagram showing another example of a structure of the schedule screen displayed by the display method of the invention when the display scale is changed, relating to an embodiment of the invention.

DETAILED DESCRIPTION OF THE PREFERRED EMBODIMENT

Figure 1:
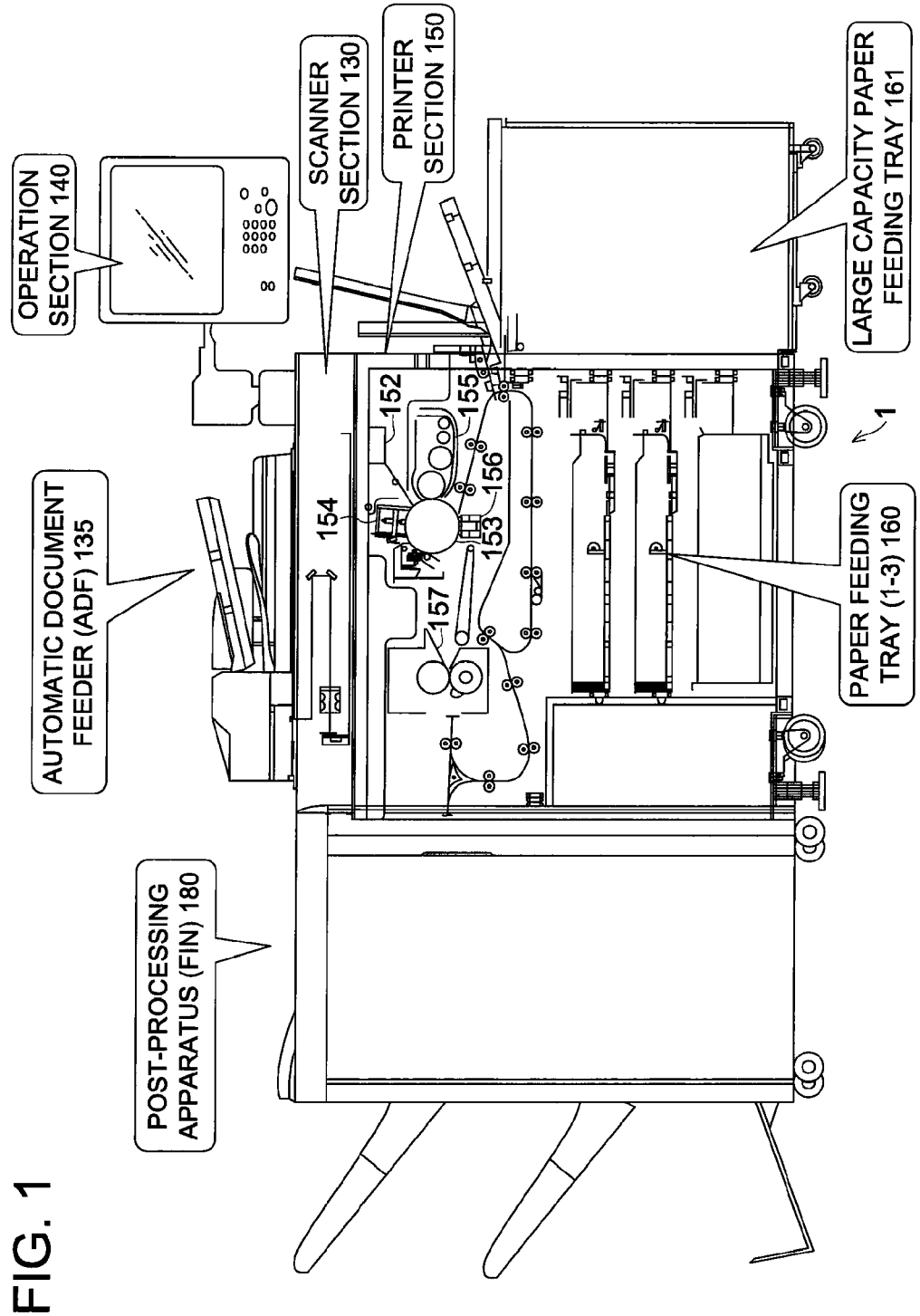
FIG. 1 is a diagram showing an example of a structure of an image forming apparatus relating to an embodiment of the invention.

An embodiment of the invention will be explained as follows, based on attached drawings. FIG. 1 is a central sectional view of the whole of the image forming apparatus that shows a mechanical structure. Its structure will be explained as follows.

On the upper portion of image forming apparatus 1, there are provided scanner section 130 including CCD 131 and automatic document feeder (ADF) 135 so that images of a document may be read. Further, operation section 140 composed of a touch panel is provided at a position where a platen glass is not positioned on the upper portion of image forming apparatus 1, so that an operator may operate and information may be displayed. The operation section 140 is one that corresponds to a display section, an inputting section and a display device of the invention.

Further, on the lower portion of the image forming apparatus 1, there are arranged plural paper feeding trays (1-3) 160 (3 steps in the drawing), and further, large capacity paper feeding tray 161 is arranged to be an annex to the image forming apparatus 1 to serve as a paper of feeding tray in the same way. Inside the main body of the image forming apparatus, there is provided a conveyance path through which a sheet that is fed from the paper feeding tray is conveyed, and there is provided printer section 150 that is composed of LD section 152, photoconductor 153, charging unit 154, developing unit 155, transfer section 156, and of fixing unit 157, and the printer section 150 corresponds to an image forming section of the invention, and it executes image data obtained from scanner section 130 and executes reserve JOB for forming an image on a sheet based on the established image forming conditions.

The charging unit 154, the developing unit 155 and the transfer section 156 are arranged around the photoconductor 153. The charging unit 154 charges a surface of the photoconductor 153 evenly before image writing. The LD section 152 forms an electrostatic latent image on the photoconductor 153 by irradiating a semiconductor laser on the photoconductor 153 whose surface is charged evenly. The developing unit 155 develops the electrostatic latent image formed on the photoconductor 153 by the LD section 152, with toner member. A toner image is formed on the photoconductor 153 by this development processing. The transfer section 156 transfers the toner image existing on the photoconductor 153 onto a sheet that is conveyed from the paper feeding tray (1-3) 160 or from large capacity paper feeding tray 161. A sheet onto which a toner image has been transferred is separated from the photoconductor 153 and is conveyed to the fixing unit 157. Toner member remaining on the photoconductor 153 is removed by a cleaning section.

In the fixing unit 157, the toner image that has been transferred onto the surface side of the sheet is fixed when the sheet conveyed to the fixing unit 157 is heated. The sheet that has undergone fixing processing is conveyed to post-processing apparatus (FNS) 180 as it is, in the case of single-sided printing. In the post processing apparatus (FNS) 180, stapling, punching and cutting are carried out. On the other hand, in the case of two-sided printing, the sheet after its fixing processing undergoes switchback, and a prescribed image is transferred on the reverse side of the sheet in the printer section 150. Thus, the sheet having images on its both sides is conveyed to the post-processing apparatus (FNS) 180 after fixing processing.

Figure 2:
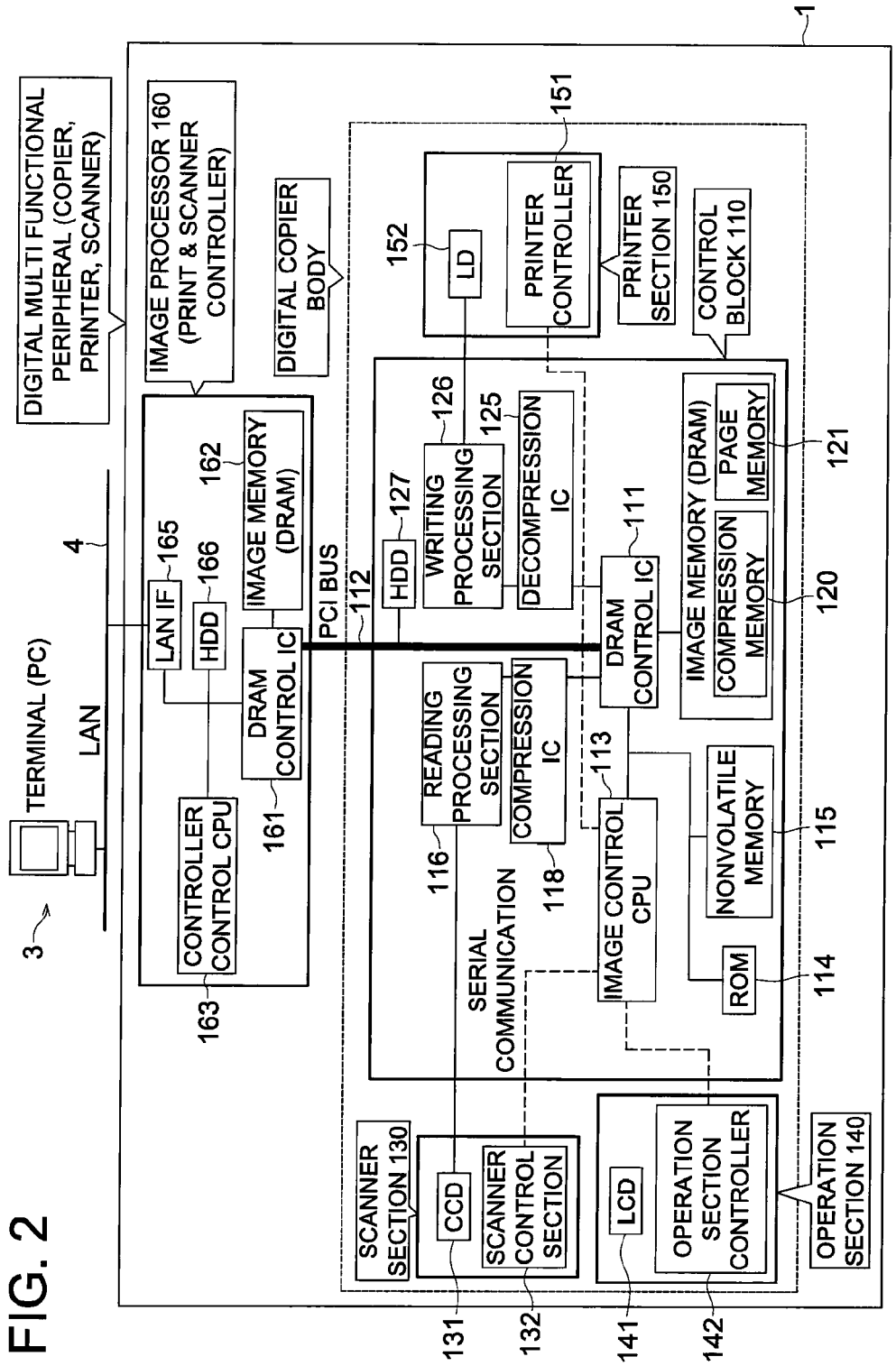
FIG. 2 is a diagram showing an example of a block structure of an image forming apparatus relating to an embodiment of the invention.

FIG. 2 is a diagram showing a circuit block of image forming apparatus 1 representing a digital multifunctional peripheral (a copier, a printer and a scanner), and its contents are explained in detail as follows.

The image forming apparatus 1 is equipped with a digital copier body having therein control block 110, scanner section 130, operation section 140 and printer section 150 and with image processing device 160 that processes image data inputted from external equipment such as terminal 3 through LAN 4, or makes it possible to transfer image data obtained through scanner section 130 to external equipment such as terminal 3 through LAN 4.

The control block 110 has PCI bus 112 connected to the aforesaid image processing device 160, and DRAM control IC 111 is connected to the aforesaid PCI bus 112. An image memory composed of compression memory 120 and of page memory 121 is connected to DRAM control IC 111. The compression memory 120 is a memory to store compression image data such as JOB schedule screen and a document, and the page memory 121 is a memory for storing temporarily non-compression image data to be printed before image forming.

Further, HDD 127 connected to PCI bus 112 preserves JOB or the like generated by terminal 3 that is connected to image forming apparatus 1 or to image processing device 160. In HDD 127, there are preserved a plurality of JOBs. In each JOB, there are included information of the whole of JOB, information of each page unit and image data. In the information of the whole of JOB (hereinafter referred to as JOB setting information), there are included, for example, information of identification number of JOB and of tray to be used and information of sheet sizes.

Further, control block 110 is equipped with image control CPU 113, and the aforesaid DRAM control IC 111 is connected to the image control CPU 113.

In addition, the image control CPU 113 is connected to ROM 114 and to nonvolatile memory 115. In the nonvolatile memory 115, there are stored establishment data including initial printing establishment information of image forming apparatus 1, machine establishment information such as process control parameter, user established values, and sheet information of each paper feeding tray (sheet size and sheet type) and control information of reserve JOB, while, in ROM 114, there are stored programs to operate the aforesaid image control CPU 113 and others.

The image control CPU 113 is capable of reading the aforesaid ROM 114 and nonvolatile data of nonvolatile memory 115, and is capable of writing desired data on nonvolatile memory 115 as nonvolatile data. The image control CPU 113 controls operations of respective sections of the image forming apparatus 1 based on the aforesaid machine establishment information, print establishment information and JOB control information. The image control CPU 113 is one to control the whole of the image forming apparatus 1, and it corresponds to the control section of the invention. The image control CPU 113 conducts management and control for a reservation and execution of JOBs stored in HDD 127 and in compression memory 120.

Next, the aforesaid scanner 130 is equipped with CCD 131 that conducts optical reading and with scanner control section 132 that conducts controlling of the whole of the scanner 130. The scanner control section 132 is connected to the aforesaid image control CPU 113 to be capable of conducting serial communication. Further, the aforesaid CCD 131 is connected to reading processing section 116 that processes image data obtained through reading by the CCD 131, and compression IC 118 that conducts compression processing for image data is connected to the reading processing section 116, and the compression IC 118 is connected to the aforesaid DRAM control IC 111.

The aforesaid operation section 140 is equipped with LCD 141 that serves as a display section and an input section and is composed of a touch panel and with operation section controller 142 that controls the whole of an operation section, and the operation section controller 142 is connected to the aforesaid image control CPU 113 to be capable of conducting serial communication. In the operation section 140, control by the image control CPU 113 is received, and setting input concerning mechanical setting input and output such as print setting and operation control conditions in image forming apparatus 1, a display of contents of setting and a display of desired information such as a schedule screen are made to be possible by LCD 141. In addition, setting (of sizes and types of sheets) for sheet information for each paper feeding tray, and setting of output mode (for example, ordinary copy mode and confirmation copy mode) are made to be possible.

Further, extension IC 125 that extends compressed image data is connected to the aforesaid DRAM control IC 111, and writing processing section 126 is connected to the extension IC 125. The writing processing section 126 is connected to LD section (laser diode) 152 of printer section 150, and conducts processing of writing data used for operations of the LD section 152. Further, the printer section 150 is equipped with printer controller 151 that controls all (paper feeding, image forming, sheet ejection and post-processing) of printer section 150, and the printer controller 151 is connected to the aforesaid image control CPU 113. The printer controller 151 operates, following the control instructions of the image control CPU 113, to control the printer section 150.

Further, DRAM control IC 161 of the image processing device 160 is connected to PCI bus 112 to which the DRAM control IC 111 is connected. The image processing device 160 is one to receive image data in image forming apparatus 1 from terminal 3 connected to LAN 4, or to transmit image data obtained by scanner section 130 to terminal 3 connected to LAN 4, when an image forming apparatus is used as a network printer or a network scanner. In the image processing device 160, image memory 162 composed of DRAM is connected to DRAM control IC 161. Further, in the image processing device 160, the aforesaid DRAM control IC 161, controller control CPU 163 that controls the whole of image processing device 160, LAN interface 165 and HDD 166 are connected to the common bus. The LAN interface 165 is connected to LAN 4.

Next, basic operations of the aforesaid image forming apparatus 1 will be explained.

First, procedures to accumulate image data in the image forming apparatus 1 will be explained.

First, an occasion to read images with scanner section 130 and to generate image data, in the image forming apparatus 1, will be explained. In the scanner section 130, images are read from a document by CCD 131 optically. In this case, operations of CCD 131 are controlled by scanner section controller 132 that receives instructions from the image control CPU 113. Reading of a document may either be conducted by automatic document feeder (ADF) 135 or be conducted by placing a document on a platen glass.

The image control CPU 113 operates in accordance with programs, and it issues instructions to scanner section 130 based on operations by operation section 140. Images obtained through reading by CCD 131 undergo data processing in reading processing section 116, and image data having undergone data processing are compressed by a prescribed method in compression IC 118, to be stored in compression memory 120 or in HDD 127 through DRAM control IC 111.

In addition, the image data are inputted in image forming apparatus 1 through LAN 4. As the aforesaid image data, there are given those generated by application programs such as terminal 3, for example, and those generated by another image forming apparatus. The aforesaid data are received by image processing device 160 through LAN 4 or LAN interface 165, and are stored temporarily in image memory 162 or HDD 166 by DRAM control IC 161. Data of the aforesaid image memory 162 or HDD 166 are forwarded to DRAM control IC 111 through PCI bus 112, and are stored temporarily in page memory 121. Data stored in page memory 121 are conveyed to compression IC 1118 in order through DRAM control IC 111, and are compressed, and are stored in compression memory 120 or HDD 127 through DRAM control IC 111.

When conducting image output in the image forming apparatus 1, image data stored in compression memory 120 or in HDD 127 in the aforesaid way are sent out to extension IC 125 through DRAM control IC 111, and the data are extended. The extended data are sent out to writing processing section 126 through DRAM control IC 111, to generate writing data, thus, writing on photoconductor 153, is conducted in LD section 152. Further, in printer section 150, printer controller 151 that has received instructions of image control CPU 113 controls respective portions such as paper feeding trays (1-3) 160, large capacity paper feeding tray 161 and conveyance paths. In the printer section 150, image forming, transfer onto a sheet, fixing, conveyance to post-processing apparatus (FNS) 180 through a conveyance path and post-processing in the post-processing apparatus (FNS) 180 are conducted in order, and printing output is carried out. Incidentally, sheet information for each paper-feeding tray is established in advance through operation section 140, and is stored in nonvolatile memory 115. Image control CPU 113 reads out data stored in the aforesaid nonvolatile memory 115 for execution of each JOB, and then, selects a paper feeding tray needed for JOB, and conducts paper feeding. When there are reserve JOBs, respective JOBs are executed in order in accordance with established order.

Next, an example of a structure of JOB schedule screen 300 will be explained. Meanwhile, in the present example, "selection" is one including a selection decided by touching of a screen and a selection decided by cursor operations. The following display control is carried out by image control CPU 113.

When a power supply for the image forming apparatus 1 is turned on, a menu image which is not illustrated as an initial screen is displayed on operation section 140. On the upper portion of the menu screen, there are displayed mechanical state button 301, JOB list button 302, reading out button 303, copy button 304 and scan button 305. When the JOB list button 302, for example, is selected, in this case, JOB control screen is displayed. Incidentally, FIG. 3 shows only a background section of a JOB control screen.

Figure 3:
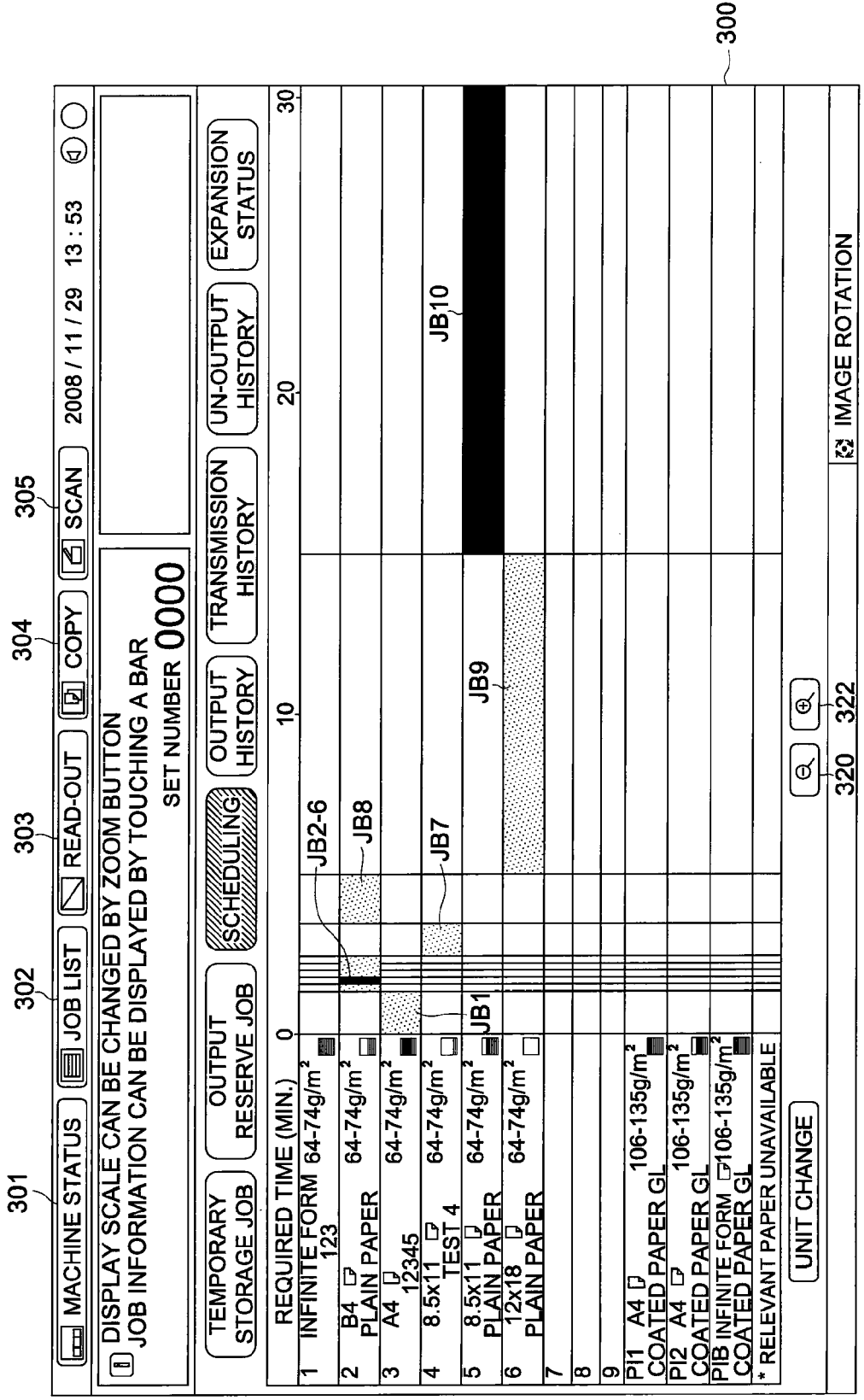
FIG. 3 is a diagram showing an example of a structure of the schedule screen relating to an embodiment of the invention.

When an unillustrated scheduling button, for example, is selected on the JOB control screen, JOB schedule screen 300 is displayed on operation section 140, as shown in FIG. 3.

The JOB schedule screen 300 is a screen for causing a user to be capable of estimating user actions such as paper feeding and replacement in advance, by informing the user visually of remaining time for each JOB, a tray to be used, a remaining amount of sheets and machine stop timing. On the vertical axis of the JOB schedule screen 300, there is arranged information of connected trays, and on the transversal axis, there is arranged time information.

On the vertical axis showing a connected tray in the JOB schedule screen 300, there are displayed tray information such as sheet tray of the image forming apparatus 1 and tray information of post-processing apparatus to be connected to the image forming apparatus 1, in order, beginning from the upper side on the left of the JOB schedule screen 300. For example, tray information such as "infinite form" is displayed in "Tray 1", then, tray information such as "B4 (landscape) plain paper" is displayed in "Tray 2", and tray information such as "A4 (portrait) plain paper" is displayed in "Tray 3". Owing to these tray information, it is possible to recognize reserved JOB that uses plural trays and to recognize tray information of JOB including JOB that is in the course of outputting prints.

On the transversal axis showing time of the JOB schedule screen 300, the numerical value corresponding to the established display scale is displayed so that time required for each JOB may be recognized visually. For example, in the case of the display scale of 30 minutes, numerals such as 0, 10, 20 and 30 are displayed as shown in FIG. 3. At the center in the lower portion of the JOB schedule screen 300, there is displayed a zoom button for changing a display scale. The zoom button is composed of contracting button 320 to contract the display scale and of expanding button 322 to expand the display scale. A user can switch the display scale freely by conducting selecting operations for the contracting button 320 or the expanding button 322. A range of switching for the display scale can be established by the 23 steps, for example, from the minimum 30 minutes to the maximum 24 hours.

Further, time information corresponding to the display scale of the JOB schedule screen 300 is stored in nonvolatile memory 115, each time the display schedule unit is switched. For example, in the case of turning on of the power supply, or in the case of transition of modes, or in the case of transition of screen from other screens, time information stored in nonvolatile memory 115 is read out, and a numerical value on the time axis of JOB schedule screen 300 is displayed based on the time information.

In JOB schedule screen 300, reserve JOB and a JOB in the course of outputting (execution) are displayed by JOB bar (JOB image) JB based on a tray to be used, an order of execution of JOB and on remaining time. In this example, JOB bars including JB1-JB 10 corresponding to 10 reserve JOBs are displayed on JOB schedule screen 300, and JOBs are displayed along the direction of time axis beginning from the left end on the screen in the order wherein the earliest order for execution of JOB comes first. For showing a border of adjoining JOBs (JOB bar JB), light and shade of background color can be switched alternately to be displayed, or dotted lines can be used for discriminating.

Further, JOB bars JB are displayed hi different colors through classification by colors for the purpose of indicating remaining number of sheets in connected trays. Meanwhile, in the drawing, blue JOB bar JB is shown by shaded area and red JOB bar JB is shown to be black area, for convenience sake. In the drawings, shaded JOB bar JB shows that sufficient sheets are stored in a sheet tray and printing is possible accordingly. Further, black JOB bars JB (JB 3 and JB 10 in the present drawing) show that no sheet is in a sheet tray, or, print output is stopped on the half way because of shortage of sheets, because of a wrong sheet. Owing to this, the state of sheet tray can be recognized visually by the user, thus, it is possible for the user to know necessity of sheet replenishment and to conduct changes of setting for paper feeding tray in advance. Namely, the black JOB bar is one to show warning. In this example, it is displayed that 5 JOBs are continued by JOB bars JB 2-6 for tray 2, and JOB bar JB 3 that is one of them is displayed to be in a black color that shows warning. Incidentally, though JOB bars are divided into two colors in the classification by colors in this example, it may also be possible to be divided into three or more colors.

When specific JOB bar JB among plural JOB bars JB displayed on JOB schedule screen is pressed down by a touching operation or a cursor operation, a pop-up screen corresponding to the selected JOB bar JB is displayed on the upper portion or the lower portion of JOB bar JB. On the pop-up screen, there are displayed detailed information in each JOB, such as, for example, a file name of the selected JOB bar JB, a sheet size, a sheet type and sheet basis weight When the display scale is changed by contracting button 320 or by expanding button 322 for the aforesaid JOB schedule screen 300, as described above, a length of the aforesaid JOB bar is also changed based on the changed display schedule.

Figure 4:
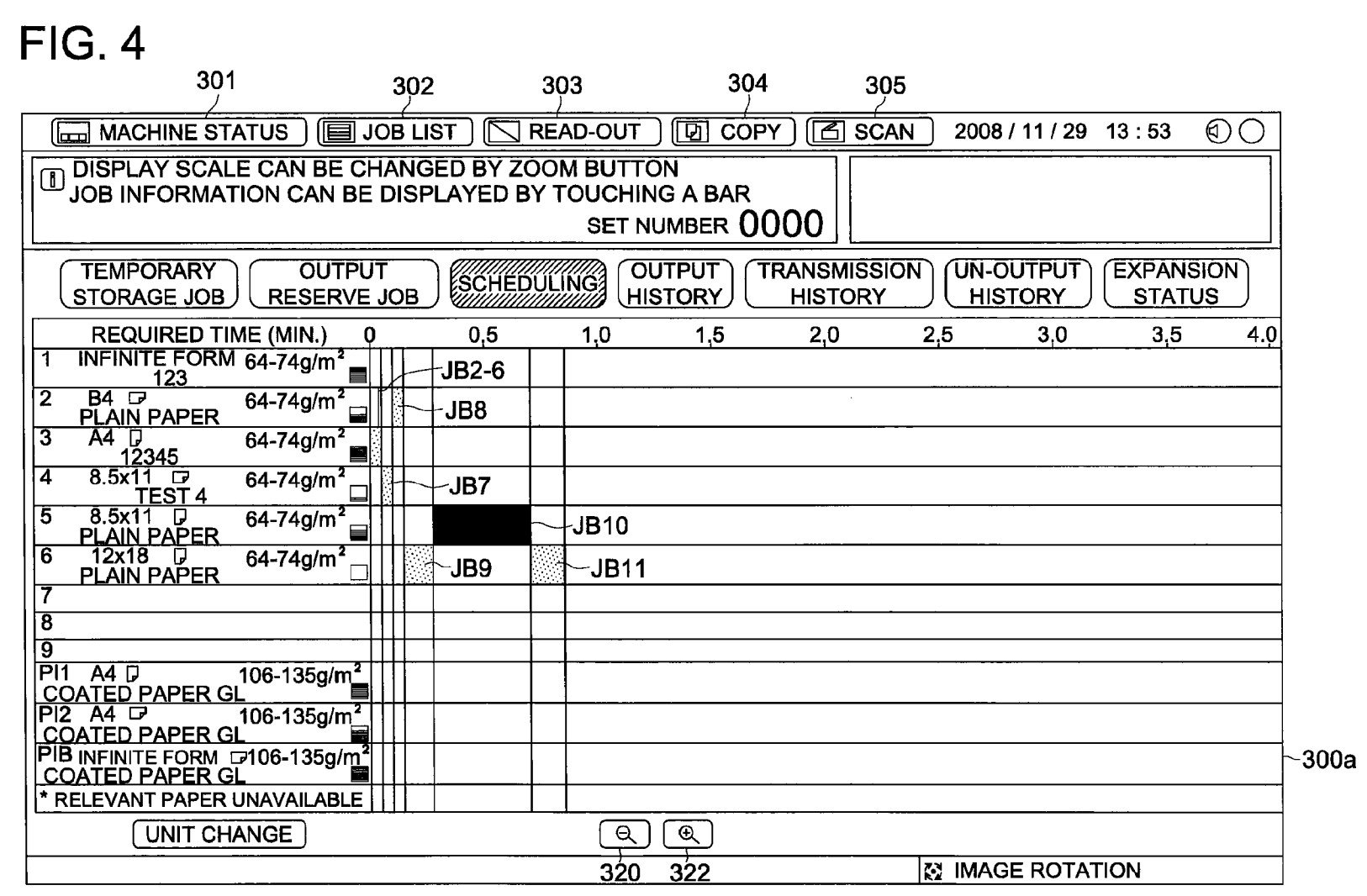

FIG. 4 is a diagram wherein a scale of 30 minutes in FIG. 3 was changed to a scale of 4 hours, and it is a display screen displayed by a display method in prior art. On the transversal axis showing time of JOB schedule screen 300a, there are displayed numerical values 0, 0.5, 1.0, 1.5 . . . 3.0, 3.5 and 4.0 as shown in FIG. 4. By this scale change, JOB bar JB 11 which has not been displayed on the scale of 30 minutes is displayed on schedule screen 300a.

In this case, when the display scale is switched to a larger unit (reduction), and when each of adjoining two JOB bars JB becomes minimum display unit or smaller than that mutually, the two JOB bars JB are displayed on the same display area to be overlapped. The same display area mentioned in this case is an area for displaying continuous JOB bars each having become the minimum display unit or smaller than that, and it can be set by a user optionally. For example, when the minimum display unit is set to 1 pixel (time axis), continuous JOB bars JB each having become the minimum display unit or smaller than that is displayed by 1 pixel of the minimum display unit.

On this JOB schedule screen 300a, JOB bars JB 2-JB 6 are overlapped. Owing to this, the whole of black JOB bar JB 3 becomes to be in the state of being displayed in the lower layer, which makes a user to be difficult to recognize warning.

FIG. 5 is one to show JOB schedule screen 300b that is displayed by the display method of the invention, when the aforesaid scale in FIG. 3 is changed in the same way as in FIG. 4. In this screen, information that should be recognized by a user, namely, information showing warning in the present example (JOB bar JB 3) is displayed to be black in the uppermost layer in priority to other JOB bars. Due to this, a user can recognize easily the information showing warning.

Figure 6:
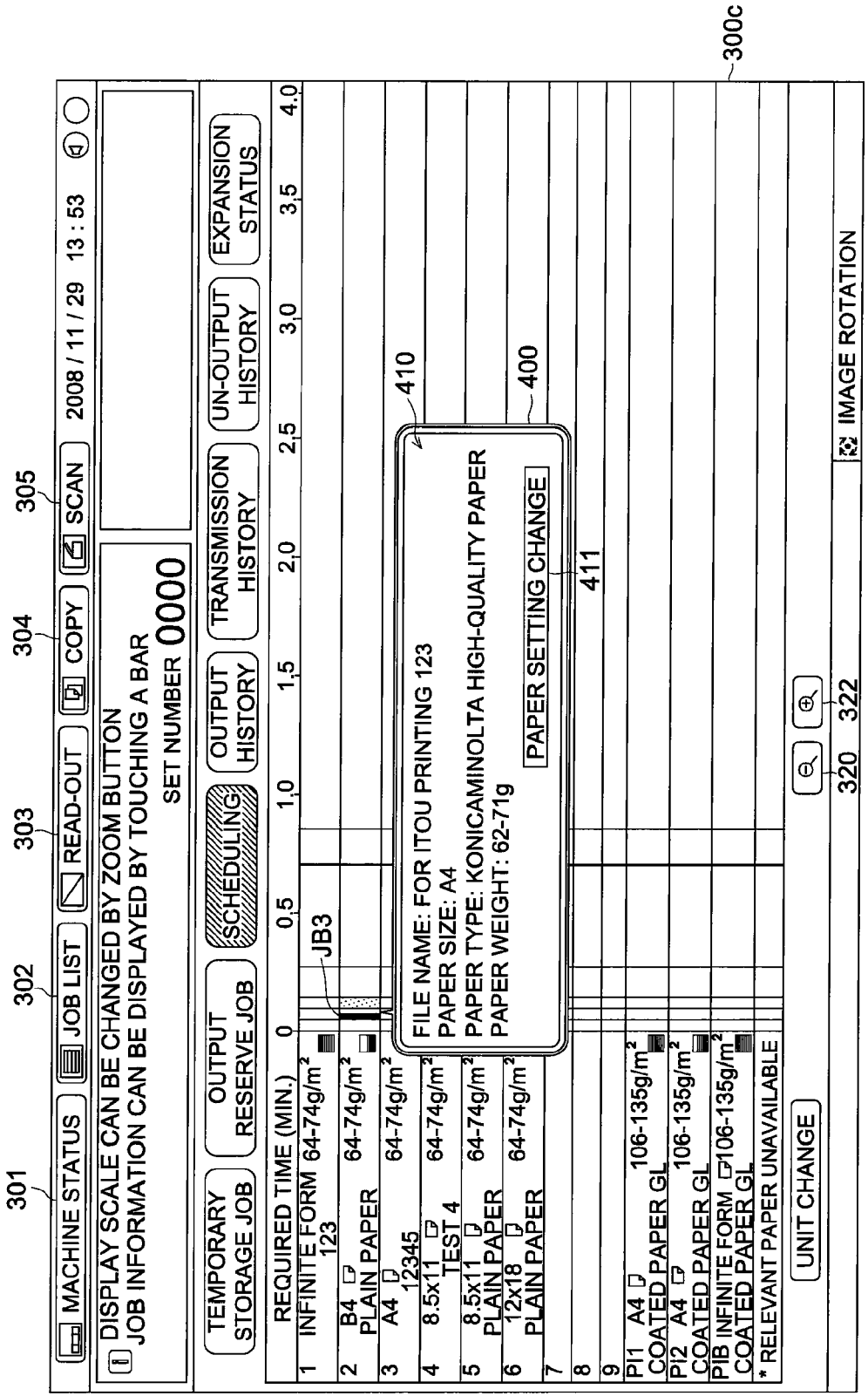
FIG. 6 is a diagram showing an example of a structure of the schedule screen when warning display is selected and operated, relating to an embodiment of the invention.

In the JOB schedule screen 300b, when JOB bar JB 3 displayed in the uppermost layer through overlapping is selected and operated through touching operations, pop-up screen 400 is displayed as is shown in JOB schedule screen 300c in FIG. 6. On the pop-up screen 400, there are displayed JOB setting information 410 including a file name of the selected JOB bar JB, a sheet size, a sheet type and a sheet basis weight, as well as button 411 for paper setting change. Owing to this, it is possible for an operator to carry out processing for dissolving contents of warning promptly, and to reduce downtime of an image forming apparatus as far as possible.

Figure 7:
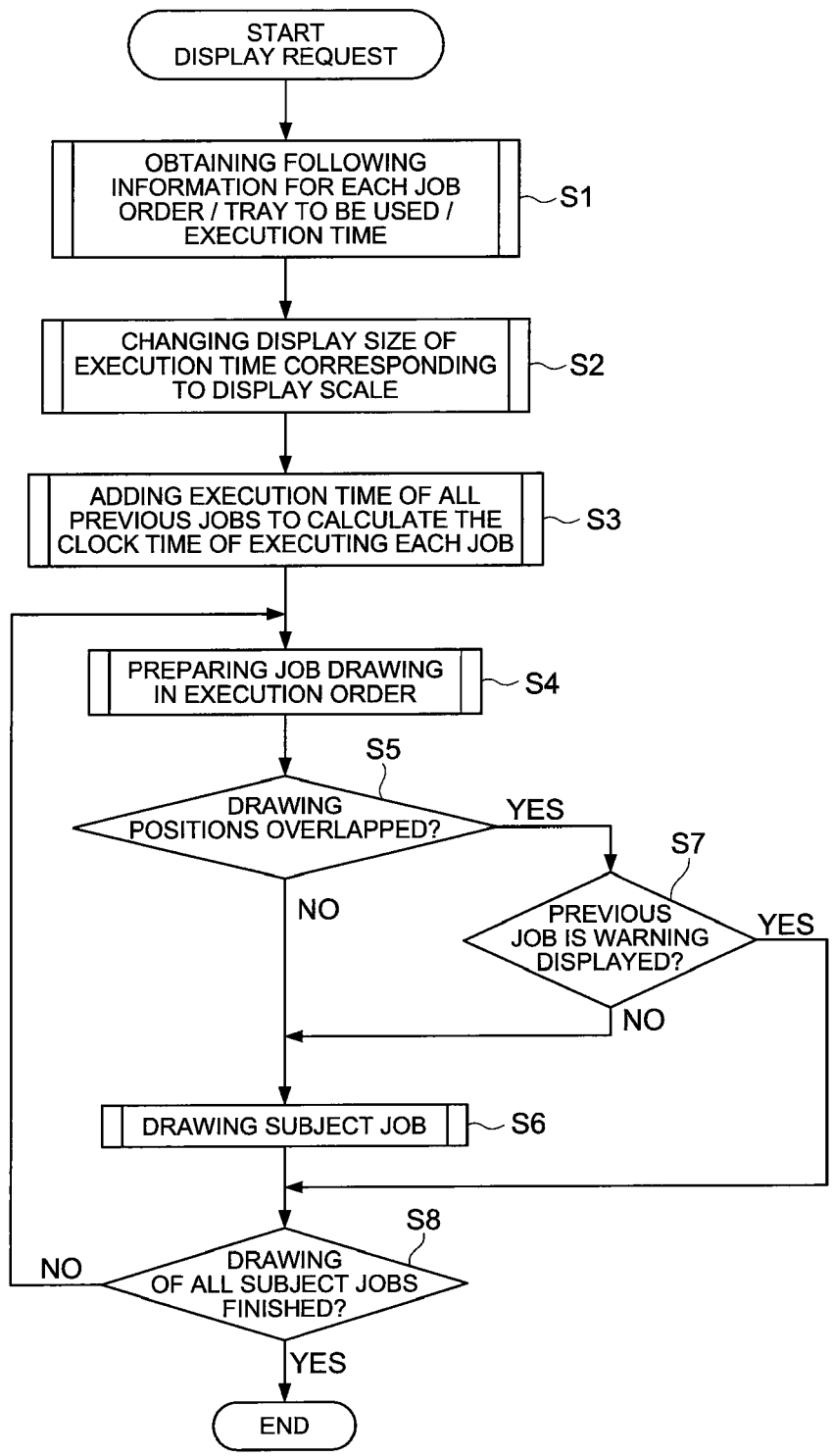
FIG. 7 is a flow chart showing procedures of a display method for schedule screen, relating to an embodiment of the invention.

Control procedures of the display method in the case where displays to be recognized by a user are overlapped in the aforesaid JOB scale screen will be explained based on a flow chart in FIG. 7.

When a display of the JOB scale screen is requested from a user, the procedures by image control CPU 113 are started In this case, when a scheduling button is selected by operations of operation system 140, the image control CPU 113 draws a background section other than JOB bar JB that constitutes JOB schedule screen. The background section includes numerical values corresponding to a sheet size and a display scale which are displayed on connected tray, contracting button 320 and expanding button 322.

In step S1, image control CPU 113 reads out and obtains execution order for each JOB, trays to be used, and JOB setting information for execution time. For example, in the case of JOB 5, image control CPU 113 obtains information such as execution order of JOB "No. 5", tray to be used "Tray 2" and execution time "1 minute 40 seconds". After that, the flow moves to step s2.

In step S2, image control CPU 113 converts execution time of each JOB obtained to the display size corresponding to display scale. In other words, the image control CPU 113 calculates a length in the direction of time axis for JOB bar JB corresponding to each JOB, from the established display scale and from execution time of JOB.

In step S3, the image control CPU 113 adds up execution times for all previous JOBs preceding its own JOB, and it calculates execution clock time of its own JOB (JOB starting clock time). For example, in the case of JOB 5, an execution clock time for its own JOB 5 is calculated by adding up execution times for JOB 1-JOB 4.

In step S4, the image control CPU 113 calculates image drawing positions in JOB schedule screen for each JOB, based on JOB setting information such as execution order of each JOB, a tray to be used, execution time and execution clock time all acquired from HDD 127, and it prepares drawing images in the order of execution clock time.

In step S5, it is judged whether the image drawing position thus prepared is overlapped with that of previous JOB or not. When the prepared image drawing position is judged not to be overlapped with previous JOB (step S5, NO), information of objective JOB is drawn on JOB schedule screen 300 (step S6). Image drawing of the aforesaid JOB is continued in the order of clock time until the moment when image drawings for all JOBs are completed (stepS8). On the other hand, when a position of image drawing for the JOB that becomes objective in the aforesaid step S5 is overlapped with that of the previous JOB (step S5, YES), the previous JOB is judged whether it is warning display or not (step S7). For example, information of JOB displayed to be in black as mentioned above corresponds to warning display. When the previous JOB is not warning display (step S7, NO), image drawing is conducted for the objective JOB (step S6). In this case, JOB information is displayed to be overlapped, but the warning display is not included in the overlapped portion. Image drawings for respective JOBs are continued in the order of clock time until the moment when image drawings for all JOBs are completed (step s8).

On the other hand, when the previous JOB is warning display (step S7, YES), a flow moves to the image drawing processing of the succeeding JOB (from step S8 to step s4) without conducting image drawing for the objective JOB. Due to this, with respect to JOB information for warning display, information of following JOB is not displayed to be overlapped, and warning display is indicated on the uppermost layer constantly. When image drawings for all JOBs are completed, processing is terminated (step S8, YES).

Incidentally, in the aforesaid example, there has been given an explanation about an occasion wherein a scale of each JOB bar JB is changed equally by a change of the display scale of the JOB schedule screen. In the following explanation, FIG. 8-FIG. 10 will be used to explain a method to display each JOB bar JB on JOB schedule screen without being based on the changed display scale, when the display scale is changed.

With respect to JOB schedule screen 300d shown in FIG. 8, JOB bars JB 1-JB 7 are displayed with display scale of 30 minutes in the same way as in FIG. 3. In this example, the JOB bars JB 2 and JB 7 are displayed to be in black, and other JOB bars are displayed through halftone, and JOB bars JB 2 and JB 7 are those to display warning.

A display scale of the aforesaid JOB schedule screen 300d is changed, and those displayed by display scale of 4 hours through a traditional display method are JOB schedule screen 300e shown in FIG. 9. In this screen, JOB bar JB 8 which was not displayed through the scale of 30 minutes is displayed newly. However, in this example, when changing the display scale, each JOB bar is not changed to be in the same change of the scale, but each JOB bar is displayed in a size that is larger than an original scale change. Namely, in the present example, the JOB bar is displayed to be extended in terms of a length in the direction toward the front and the direction toward the rear, in the direction of time axis. Due to this, it becomes easy to recognize each JOB bar visually, also in the case of changing a display scale. Incidentally, though all JOB bars are displayed after being extended in the direction of time axis, in this example, it is also possible to display only JOB bars which are in the prescribed length or shorter, after changing a form.

However, even in the case of the display method of this kind, if JOBs are continued for the same tray, image drawing positions for JOBs are forced to be overlapped as is shown in FIG. 9, thus, a part or the whole of JOB information pieces are positioned to the lower layer side, resulting in a problem that visual confirmation is difficult In the JOB schedule screen 300d in FIG. 8 before the scale change, JOB bar JB 2 is displayed remarkably to be in black as a warning display. However, in the JOB schedule screen 300e in FIG. 9 after the scale change, only a mere portion of the JOB bar JB 2 is displayed in the upper layer side, and the greater part of the JOB bar JB 2 is positioned in the lower layer side of other JOB bars JB 3 and JB 5, resulting in a problem that visual confirmation is difficult.

Even in the case of the display situation mentioned above, it is possible to display the JOB bar for warning display on the uppermost layer, in the display method of the invention. JOB schedule screen 300f shown in FIG. 10 is one in which JOB bar JB 2 is displayed on the uppermost layer. The JOB bar JB 2 is displayed to be larger than its original size of display scale, thus, it is more easy for a user to recognize visually, and operations for selection can be conducted easily.

Meanwhile, though the explanation has been given for the occasion wherein each JOB bar is displayed to be larger in terms of a size than an actual display scale in the aforesaid situation, it is also possible to use a method wherein each JOB bar is changed in terms of a shape to serve as a mark, so that visual confirmation may become easy, and in this case again, visual recognition and selection operations become easy, by displaying JOB bar for warning display in the uppermost layer. It is further possible to use a method that is a combination of the aforesaid two methods to make the visual confirmation to be easier.

The invention has been explained above, based on the aforesaid embodiment, and the invention is not limited to contents of the embodiment, and the disclosed embodiment can be varied without departing from the spirit and scope of the invention.

On the schedule screen indicating the execution reserve state of JOB on the display section, when the information that should be recognized by a user exists in pieces of information displayed to be overlapped, in the case of displaying a part or the whole of information concerning the aforesaid two or more of the aforesaid JOBs depending on display conditions of the schedule screen, to be overlapped on the aforesaid schedule screen, the invention makes it possible for a user to confirm visually the information by controlling display so that the information that should be recognized by the user may be displayed on the uppermost layer.

Incidentally, the display section has only to be one that can display the aforesaid information, and CRT, a liquid crystal display and an organic EL can be used. Further, it is possible to constitute a display section with a touch panel that serves also as an inputting section. On the touch panel, it is possible to conduct detection for the display panel section and for a coordinate position corresponding to a button position for the display panel. Further, an inputting portion may also be one composed of a mouse and a cursor key, in addition to the foregoing. In a word, the inputting portion has only to be one that can select the information of JOB displayed on a schedule screen.

As the aforesaid display conditions, there are given display scales on the schedule screen. For example, in some display scales, it is necessary to display a part or the whole of the information to be overlapped, when it is difficult to display information concerning the aforesaid two or more JOBs on a thorough noninterference basis. In this overlapped display, when the information that should be recognized by a user, such as the information of warning becomes to be invisible utterly, or when the aforesaid information is invisible except only an extremely a part of the information, visual confirmation by a user becomes difficult. Therefore, when this information is displayed on the uppermost layer, visibility by a user becomes possible. Display on the uppermost layer may either be one where all of display areas concerning the information are displayed or be one wherein recognition and selection operations for a user are made to be easy by enlarging its area to the minimum unit or more, though only a part of display area of information is displayed, and the entire portion of information area is not covered when the display area of the information is limited to a part to be less than a minimum unit.

Incidentally, when a change of a display scale is possible, and when the display scale has been changed in the direction for the display scale to be reduced, it is also possible to conduct a display of information concerning the aforesaid JOB by changing a size and a shape of the display to those which make a user to recognize easily, without being based on the changed display scale. Owing to this display, it is possible to display the information that should be recognized by a user on the uppermost layer to make visual confirmation to be possible, when information that should be recognized by a user is in existence in information displayed to be overlapped in the same way as in the foregoing, even in the case where a part or the whole of the information are overlapped.

Information relating to JOB can be displayed by character information or by functional buttons, and selecting operations for the information can be carried out by an input section such as a touch panel or a mouse. Further, for the information displayed on the uppermost layer, it is possible to make selecting operations for the aforesaid information to be possible equally. After the selecting operations have been conducted, processing established in advance is carried out. For example, it is possible to indicate a display related to the aforesaid JOB on the uppermost layer through a pop-up screen. When the information which should be recognized by a user is a warning, it is possible to conduct detailed display of the warning as a display related to the JOB.

As explained above, the present invention makes it possible for a user to recognize surely the information that should be recognized by the user such as warning information by displaying the aforesaid information on the uppermost layer, even in the case where plural pieces of information are in existence in the same position within the schedule screen. Further, if information items displayed on the uppermost layer are made to be possible for selecting operations, there is an effect to make it possible to operate target buttons including warning information preferentially.

What is claimed is:

1. A display method for displaying a schedule screen which indicates an execution reservation state of JOBs on a display section, the method comprising:

displaying, in accordance with a display scale condition of the schedule screen, a part or a whole of at least two job bar images concerning the JOBs such that the at least two job bar images are superimposed over each other in a same area on the schedule screen, wherein each of the job bar images comprises a bar shaped rectangular image having a width which corresponds to a time period required for executing a respective one of the JOBs; and displaying, in cases where information which is required to be recognized by a user exists in any of the at least two job bar images which are superimposed over each other, the job bar image including the information required to be recognized by the user on an uppermost layer so as to be visible on the schedule screen;

wherein the at least two job bar images are displayed to be superimposed over each other in the same area of the schedule screen in response to a change in the display scale condition, the at least two job bar images not having been displayed to be superimposed over each other before the change in the display scale condition.

2. The display method of claim 1, further comprising displaying the part or the whole of the at least two job bar images concerning the JOBs according to a change of the display scale, wherein the part or the whole of the at least two job bar images concerning the JOBs is displayed with a scale different from the scale after the change or with a deformed shape.

3. The display method of claim 1, wherein the information required to be recognized by the user comprises information indicating a warning to the user.

4. The display method of claim 1, wherein the job bar image displayed so as to be visible on the schedule screen is capable of being selected by a selection operation by a user.

5. The display method of claim 4, further comprising displaying, on the display section and in response to the selection operation, information relating to the job bar image displayed so as to be visible on the schedule screen.

6. The display method of claim 1, wherein:
the display section comprises a display section of an image formation apparatus; and
the display method is adapted to display the schedule screen, which displays the execution reservation state of the JOBs for printing through image formation, on the display section of the image formation apparatus.

7. A display device comprising:
a display screen which displays information; and
a processor which controls the display screen,
wherein the processor is configured to control so as to (i) display a schedule screen indicating an execution reservation state of JOBs on the display screen, (ii) display a part or a whole of at least two job bar images each concerning a respective one of the JOBs such that the at least two job bar images are superimposed over each other in a same area on the schedule screen, according to a display scale condition of the schedule screen, and (iii) display, in cases where information which is required to be recognized by a user exists in any of the at least two job bar images which are superimposed over each other, the job bar image including the information required to be recognized by the user on an uppermost layer so as to be visible on the schedule screen,
wherein each of the job bar images comprises a bar shaped rectangular image having a width which corresponds to a time period required for executing a respective one of the JOBs, and
wherein the at least two job bar images are displayed to be superimposed over each other in the same area of the schedule screen in response to a change in the display scale condition, the at least two job bar images not having been displayed to be superimposed over each other before the change in the display scale condition.

8. The display device of claim 7, wherein the processor is configured to enable a change of the display scale, and in cases of displaying the at least two job bar images concerning the JOBs according to the change of the display scale, controls to display the part or the whole of the at least two job bar images concerning the JOBs with a scale different from the scale after the change or with a deformed shape.

9. The display device of claim 7, wherein the information required to be recognized by the user comprises information indicating a warning to the user.

10. The display device of claim 7, wherein the information required to be recognized by the user and displayed so as to be visible on the schedule screen comprises character information.

11. The display device of claim 7, wherein the at least two job bar images displayed to be superimposed in the same area on the schedule screen are capable of being selected by a selection operation.

12. The display device of claim 11, wherein in cases where the job bar image including the information required to be recognized by a user exists among the superimposed job bar images, the processor controls so as to display the job bar image including the information required to be recognized by the user on the uppermost layer, and to enable the selection operation thereof.

13. The display device of claim 7, further comprising an input section which is controllable by the processor and through which an input operation by a user is receivable, wherein the processor enables the input section to accept a selection operation of the job bar image displayed so as to be visible on the schedule screen.

14. The display device of claim 13, wherein the processor controls so as to display, on the uppermost layer and in response to the selection operation, information relating to the job bar image displayed so as to be visible on the schedule screen.

15. An image forming apparatus comprising:
an image forming section which executes an image formation based on image data;
a display screen which displays information; and
a processor which controls the image forming section and the display screen,
wherein the processor is configured to control so as to (i) display a schedule screen indicating an execution reservation state of JOBs on the display screen, (ii) display a part or a whole of at least two job bar images each concerning a respective one of the JOBs such that the job bar images are superimposed over each other in a same area on the schedule screen, according to a display scale condition of the schedule screen, and (iii) display, in cases where information which is required to be recognized by a user exists in any of the at least two job bar images which are superimposed over each other, the job bar image including the information required to be recognized by the user on an uppermost layer so as to be visible on the schedule screen,
wherein each of the job bar images comprises a bar shaped rectangular image having a width which corresponds to a time period required for executing a respective one of the JOBs, and
wherein the at least two job bar images are displayed to be superimposed over each other in the same area of the schedule screen in response to a change in the display scale condition, the at least two job bar images not having been displayed to be superimposed over each other before the change in the display scale condition.

16. The image forming apparatus of claim 15, wherein the processor is configured to enable a change of the display scale, and in cases of displaying the at least two job bar images concerning the JOBs according to the change of the display scale, controls to display the part or the whole of the at least two job bar images concerning the JOBs with a scale different from the scale after the change or with a deformed shape.

17. The image forming apparatus of claim 15, wherein the information required to be recognized by the user comprises information indicating a warning to the user.

18. The image forming apparatus of claim 15, wherein the information required to be recognized by the user and displayed so as to be visible on the schedule screen comprises character information.

19. The image forming apparatus of claim 15, wherein the at least two job bar images displayed to be superimposed in the same area on the schedule screen are capable of being selected by a selection operation.

20. The image forming apparatus of claim 19, wherein in cases where the job bar image including the information required to be recognized by a user exists among the superimposed job bar images, the processor controls so as to display the job bar image including the information required to be recognized by the user on the uppermost layer, and to enable the selection operation thereof.

21. The image forming apparatus of claim 15, further comprising an input section which is controllable by the processor and through which an input operation by a user is receivable, wherein the processor enables the input section to accept a selection operation of the job bar image displayed so as to be visible on the schedule screen.

22. The image forming apparatus of claim 21, wherein the processor controls so as to display, on the uppermost layer and in response to the selection operation, information relating to the job bar image displayed so as to be visible on the schedule screen.

23. The display method of claim 1, wherein the at least two job bar images displayed on the schedule screen are superimposed over each other in the same area of the schedule screen according to a change of the display scale of the schedule screen.

24. The display method of claim 1, wherein the displayed part or the whole of the at least two job bar images are superimposed over each other in the same area on the schedule screen so as not to be distinguishable from each other by the user.

25. The display method of claim 1, wherein the job bar image indicates information about a print job.

26. The display method of claim 1, wherein each job bar image displayed on the schedule screen corresponds to a single print job at any display scale condition.

27. The display method of claim 1, further comprising displaying tray information of each of a plurality of paper feeding trays available for performing the JOBs, the tray information being displayed in association with a respective job bar image corresponding to the tray information of the paper feeding tray, and the tray information being displayed along a first axis which is one of a vertical axis and a horizontal axis,
    wherein the part or the whole of at least two job bar images are superimposed over each other in the same area on the schedule screen when the display scale condition of a second axis, which is the other of the vertical axis and the horizontal axis, is changed.

28. The display method of claim of claim 1, wherein the width of the job bar image corresponding to a time axis is changed when the display scale condition is changed.

* * * * *